United States Patent [19]

Farmer et al.

[11] Patent Number: 4,800,541

[45] Date of Patent: Jan. 24, 1989

[54] METHOD FOR UNDERWATER ACOUSTIC DIRECTION SENSING

[75] Inventors: David M. Farmer, Saanichton; Jane A. Verrall, Victoria, both of Canada

[73] Assignee: Canadian Patents and Development Limited, Ottawa, Canada

[21] Appl. No.: 13,933

[22] Filed: Feb. 12, 1987

[51] Int. Cl.$^4$ .............................................. G01S 3/80
[52] U.S. Cl. .................................. 367/424; 367/118; 367/125; 367/129
[58] Field of Search ............... 367/118, 123, 125, 127, 367/128, 129, 902; 342/147, 156, 118, 127, 146; 356/3, 4.5

[56] References Cited

U.S. PATENT DOCUMENTS

| | | | |
|---|---|---|---|
| 3,870,989 | 3/1975 | Mallet | 367/125 |
| 4,170,001 | 10/1979 | Townsend | 367/120 |
| 4,312,053 | 1/1982 | Lipsky | 367/127 |
| 4,336,606 | 6/1982 | Heard | 367/117 |

FOREIGN PATENT DOCUMENTS

| | | |
|---|---|---|
| 831640 | 1/1970 | Canada . |
| 864106 | 2/1971 | Canada . |
| 923216 | 3/1973 | Canada . |
| 1127749 | 7/1982 | Canada . |

OTHER PUBLICATIONS

Farmer & Clifford, Space-Time Acoustic Scintillation Analysis, A New Technique For Probing Ocean Flows, IEEE J. Ocean Engr., Jan. 1986.

*Primary Examiner*—Thomas H. Taroza
*Assistant Examiner*—Daniel T. Pihulic
*Attorney, Agent, or Firm*—Christie, Parker & Hale

[57] ABSTRACT

A method of determining the bearing "S" of a signal transmitter relative to a remote signal receiver. A signal pulse having a high signal to noise ratio is transmitted and sampled at closely spaced receivers displaced from the transmitter by a distance "D". Sampled phase components are derived at each receiver by deriving in-phase and quadrature components of the sampled pulse and by deriving the arctangent of each such component. The arrival time of the sampled pulses is measured by applying a least squares Gaussian fit to the modulus or to the amplitude envelope of the pulse samples. The difference "$\delta t$" between the time of arrival of the pulse at each receiver is determined and then the approximate phase difference $2\pi\omega\delta t$ between the sampled pulses is determined where "$\omega$" is the carrier frequency of the transmitted pulse. The phase difference is then applied to resolve the phase ambiguity of the phase components and the bearing "S" is then calculated.

The method also facilitates correction of errors in the apparent transmitter bearing which are introduced by relative medium movement, in which the signal pulse is transmitted through a medium which moves with a component of velocity "u" perpendicular to the acoustic path between the transmitter and receivers, thereby causing the bearing to appear to deviate from the actual bearing of the transmitter relative to the receivers; and, by small scale fluctuations in sound speed between the transmitter and each of the receivers.

7 Claims, 3 Drawing Sheets

METHOD FOR UNDERWATER ACOUSTIC DIRECTION SENSING

FIELD OF THE INVENTION

This application pertains to a method of determining the bearing of an underwater signal transmitter relative to a remote underwater signal receiver. More particularly, the method facilitates elimination of the phase ambiguity of a signal transmitted from the underwater transmitter to the underwater receiver. The method also facilitates correction for slow speed drift of the medium through which the signal is transmitted, which drift causes the bearing of the transmitter relative to the receiver to appear to deviate from the actual bearing. The method also facilitates correction of the bearing measurement for small scale fluctuations in sound speed between the transmitter and individual receivers.

BACKGROUND OF THE INVENTION

Underwater acoustic direction sensing techniques are used, for example, to accurately determine the position of a sensor towed behind a ship. Such sensors are conventionally used in underwater acoustic surveying and positioning applications. However, the accuracy of measurements made by such sensors is governed by the accuracy with which the position of the sensor itself can be determined. Suppose for example that a sensor towed behind a ship is to produce a measurement representative of the position of a point on the seabed relative to the sensor. If the position of the sensor, relative to the ship, at the time the measurement is made can be determined only approximately, then the location of the point on the seabed relative to the ship can also be determined only approximately, regardless of the precision of the measurement made by the sensor.

The prior art has evolved a variety of underwater acoustic direction sensing techniques. A technique known as "long baseline" sensing is used to measure the time required for an underwater transmitted pulse to reach each of several widely separated underwater receivers, following which conventional triangulation methods are used to determine the position of the underwater transmitter relative to the receivers. A technique known as "short baseline" sensing is used in situations where it is impractical to locate several sensors along an extended receiver baseline. For example, the receivers may be aboard a ship and so the receiver spacing (i.e. the "baseline") is limited by the physical dimensions of the ship. Triangulation is again used to determine the position of a remote transmitter relative to the receivers, although the shortened receiver baseline impairs the accuracy with which the transmitter position can be determined; the essential difficulty being that if the distance between the receivers exceeds half the wavelength of the transmitted signal then one cannot unambiguously resolve the phase angle of the transmitted signal. It happens that the phase angle of the received signal, together with the received signal amplitude information, permits more accurate time (i.e. signal propagation delay; and therefore distance) measurements to be made than those attainable by working with only the amplitude information contained in a received signal. Thus, the problem is to accurately and unambiguously measure the phase angle of the received signal relative to that of the transmitted signal. In a technique known as "ultra-short baseline" sensing the receivers are spaced apart by a distance equal to one half the wavelength of the transmitted signal, thereby facilitating unambiguous resolution of the phase angle of the received signal relative to that of the transmitted signal. However, the accuracy of a bearing measurement based on phase angles detected at two receivers increases as the distance between the receivers increases. Accordingly, more accurate measurements can be made if the receivers are separated by many wavelengths, provided the aforementioned phase ambiguity can be resolved.

Further factors affect the accuracy with which the bearing of a signal transmitter may be determined relative to a remote signal receiver. For example, the water through which the signal is transmitted normally moves with a component of velocity perpendicular to the acoustic path between the transmitter and receiver, thereby causing the bearing of the transmitter relative to the receiver to appear to deviate from the actual bearing by a factor which is governed by the aforementioned component of velocity and by the propagation velocity of the transmitted signal. Moreover, fluctuations in water temperature establish a sound speed gradient between the transmitter and receiver which causes further apparent deviation of the transmitter bearing relative to the receiver. Yet another factor which conventionally degrades the accuracy with which the bearing of the transmitter relative to the receiver may be determined is that the direct signal paths between the transmitter and the separated receivers are affected by sound speed differences between the two paths caused by variations in the physical characteristics of the water which the signals pass through in traversing each path.

The inventors have developed a method of determining the bearing of a signal transmitter relative to a remote signal receiver consisting of two or more receivers which are separated by many wavelengths. The method resolves the aforementioned phase ambiguity problem and also provides for correction of the errors introduced by the aforementioned factors, thereby yielding highly accurate position measurements.

SUMMARY OF THE INVENTION

The invention provides a method of determining the bearing "S" of a signal transmitter relative to a remote signal receiver. A signal pulse having a high signal to noise ratio is transmitted from the transmitter. The transmitted pulse is sampled at first and second receivers which are closely spaced relative to one another but which are nevertheless separated by at least several wavelengths of the transmitted signal. The spaced receivers are displaced from the transmitter by a distance "D" which may vary over time. For each receiver, the sampled pulse in-phase and quadrature components are derived; the phase of the sampled pulse is given by the arctangent of the ratio of the in-phase component divided by the quadrature component. For each receiver, the arrival time "t" of the sampled pulses is then determined by applying a least squares Gaussian fit to the modulus or to the amplitude envelope of the pulse samples. The difference "δt" between the time of arrival of the pulse at each receiver is then determined, following which the approximate phase difference (to within ½ wave period) $\Delta\phi = 2\pi\omega\delta t$ between the sampled pulses is determined, where "ω" is the carrier frequency of the transmitted pulse. The approximate phase difference so determined is then used to resolve the phase ambiguity of the derived phase components and then the bearing "S" is determined as:

$$\cos(S) = \frac{(\Delta\phi)(c)}{(2\pi)(\omega)r}$$

where "c" is the pulse propagation velocity and "r" is the displacement between the receivers.

The invention also provides for correction of the bearing "S" for differences in sound speed between the transmitter and each of the receivers; namely, small scale sound speed variations, typically of a size comparable to the spacing between the receivers. This may be accomplished by delaying the sampling of the transmitted pulse at the second receiver for a time equal to the average time taken for the sound speed fluctuations to move from the acoustic path between the transmitter and the first receiver to the acoustic path between the transmitter and the second receiver. Alternatively, the time delay may be determined by deriving short segments of first and second phase time series $\phi_1(t)$ and $\phi_2(t)$ for the first and second receivers respectively. The phase time series for each receiver are cross-correlated as a function of time lag "$\tau$" to select that value of $\tau$ which yields the maximum cross-correlation value. The corresponding bearing "S" is then evaluated with the first and second phase time series time shifted by the value of $\tau$ selected in the previous step. The process is then repeated for each successive time series segment and the results are then averaged.

The invention also provides a method wherein the pulse is transmitted through a medium which moves with a component of velocity "u" perpendicular to the acoustic path between the transmitter and receivers, thereby causing the bearing "S" to appear to deviate from the actual bearing of the transmitter relative to the receivers. In this case, the method further comprises correcting the bearing for such relative medium movement by applying a factor u/c as the sine of the difference between the actual and determined bearings.

DETAILED DESCRIPTION OF THE PREFERRED EMBODIMENT

For purposes of illustration, and to simplify the discussion, the preferred embodiment is described in terms of an experiment conducted by the inventors in which the transmitter and receivers were both fixed in position. The experimental observations thereby obtained enabled the inventors to study the relevant effects in an environment in which the bearing of the transmitter was known and non-varying and to confirm the utility of the techniques hereinafter described. It is to be understood however that the invention is of general application and is particularly well suited to use in situations in which at least one component (i.e. the transmitter or the receivers) moves with respect to the other component.

Figure 1:
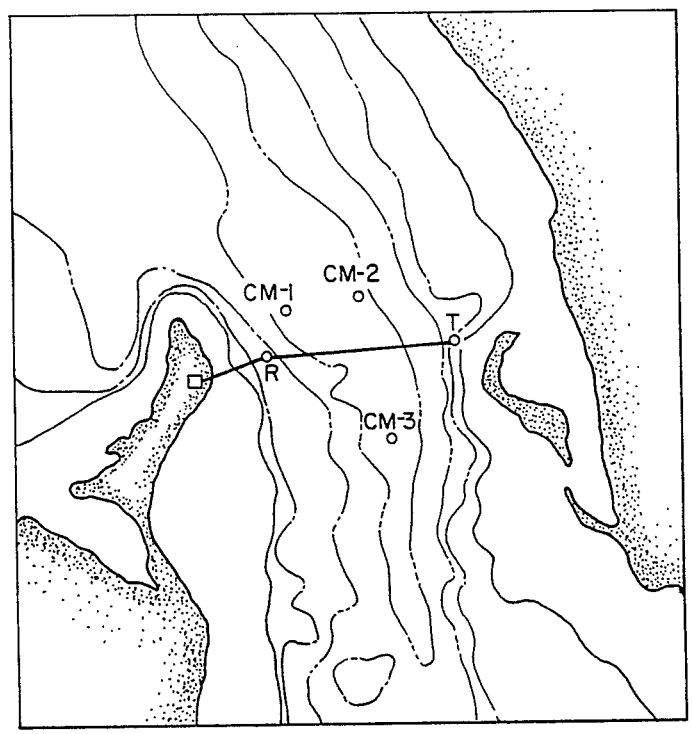
FIG. 1 is a top plan view depicting a special case in which an underwater acoustic transmitter is fixed in position in a tidal channel relative to two fixed receivers.

FIG. 1 depicts the deployment, in an experiment conducted by the inventors, of one underwater acoustic transmitter "T" and two receivers "$R_1$" and "$R_2$" in a tidal channel. Due to the scale of FIG. 1 the two receivers are depicted in FIG. 1 as a single receiver "R". The receivers were mounted one meter apart on a rigid arm which was aligned approximately parallel to the channel axis. A series of three identical pseudo random noise coded sequences superimposed on an 86 kHz carrier frequency were transmitted five times each second. Other transmission techniques capable of producing high signal to noise ratio pulses could also be used. Three current meters "CM-1", "CM-2" and "CM-3" were positioned relative to the receivers and transmitter as shown in FIG. 1.

The transmitted pseudo random noise code consisted of a 127 bit pseudo random sequence of ones and zeroes which was used to modulate the carrier frequency. The signal was transmitted for the duration of each "one" bit; no signal was transmitted for a "zero". The transmitted pulses consisted of three such sequences or 381 bits in total and the signal was sampled four times for each bit. The first and third 127 bit sequences served as buffers to improve the signal to noise ratio of the second sequence. The signal pulse was recovered by deconvolving the received signal with a pseudo random noise coded sequence identical to that employed at the transmitter to modulate the carrier. The correlation direct path peaks from experimental data were followed by smaller peaks representative of multipath signals (i.e. signals reflected off the sea bottom and/or surface and/or underwater objects).

Figure 2:
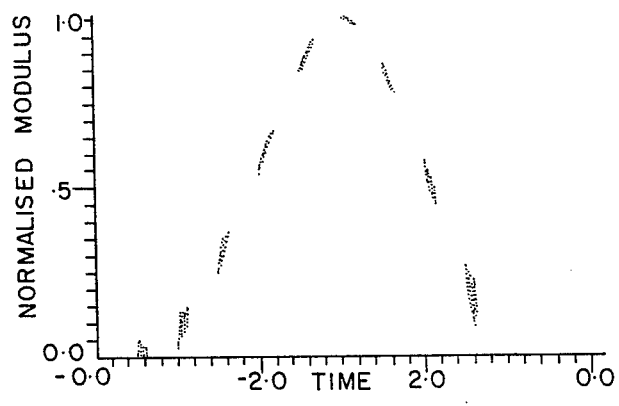
FIG. 2 is a graph on which signal arrival time is plotted as the abscissa, versus the normalized modulus of signal amplitude as the ordinate.

The in-phase and quadrature components of the received signal (relative to the 86 kHz carrier frequency oscillator) were recorded for both receivers. The phase of the received signal was then derived by taking the arctangent of the ratio of each part of the in-phase and quadrature components. The arrival time "t" of the received signals (i.e. the time taken for the transmitted signal to travel from T to each of $R_1$ and $R_2$) was also determined from the time corresponding to the centre or apex of the time corresponding to the maximum value of the correlation peak, deduced by a quadratic fit to the central, deconvolved, pseudo-random noise sequence for each pulse. FIG. 2 shows a composite plot of many of these peaks after they had been normalized by the quadratic fit and centered at time zero. The correlation peaks are theoretically triangular, but some rounding occurs in practice, due to the finite bandwidth of the transducers employed. One unit on the horizontal scale equals one sampling interval. The sample points shifted slightly along the peak because of changes in signal arrival time. The top of the peak was not triangular, but was smoothed off because of the finite bandwidth of the transducers. The difference "$\delta t$" in the arrival times was then used to estimate the phase difference "$\Delta\phi$" in radians between the receivers:

$$\Delta\phi = 2\pi\omega\delta t.$$

where "ω" is the carrier frequency of the transmitted pulse. This estimate was then used to resolve the ambiguity in the measured phase difference.

In practice, considerable averaging is required in order to reliably remove the phase difference ambiguity. The difficulty is that the arrival time measurements are typically quite noisy compared to the phase measurements. At the relatively slow sampling frequency employed (20.235 kHz or 4.25 cycles of the carrier frequency) one cannot expect to measure the signal arrival time accurately to a small fraction of the carrier cycle, even with interpolation between sampling points. However, by averaging the received signal arrival time over a large number of cycles the aforementioned phase ambiguity may be resolved to a tolerably acceptable degree, thereby facilitating tolerably accurate calculation of the angle at which the received signal reached the receiver. By assuming that the signal reaching the receiver is a plane wave one may easily show that the bearing "S" of the signal transmitter relative to the signal receiver is given by:

$$\cos(S) = \frac{(\Delta\phi)(c)}{(2\pi)(\omega)r}$$

where "c" is the propagation velocity of the transmitted signal, and "r" is the displacement between receivers $R_1$ and $R_2$.

It should be noted that a second ambiguity in direction arises if only two receivers are employed, since one cannot without further information distinguish between signals arriving at the receiver from a transmitter positioned at a particular angle with respect to the two receivers, and signals originating from a transmitter positioned at the negative of that angle with respect to the two receivers. In practice, this problem can often be resolved with the aid of general knowledge of the orientation of the transmitter and receivers (for example, one knows that a towed sensor follows behind the ship and not ahead of it). Alternatively, three or more receivers can be used to eliminate the problem.

The inventors have found that the aforementioned method of resolving the phase ambiguity is insufficiently accurate to facilitate accurate determination of the transmitter bearing. As explained above, resolution of the phase ambiguity depends in turn upon the accuracy with which the received signal arrival time may be determined, which in turn depends upon the rate at which the transmitted signal is sampled at the receivers and upon the method used to interpolate between samples.

The problem was then to fit a curve to the data shown in FIG. 2. Various techniques were employed, including a least-squares quadratic fit and a straight line fit to the leading edge of the curve. However, these techniques proved to be too imprecise to facilitate suitably accurate resolution of the phase ambiguity. An error in determining the signal arrival time of one eighth of the sampling interval corresponded to an error of over 180° in the measured phase which could therefore cause the ambiguity of the measured phase to be resolved incorrectly.

Figure 3:
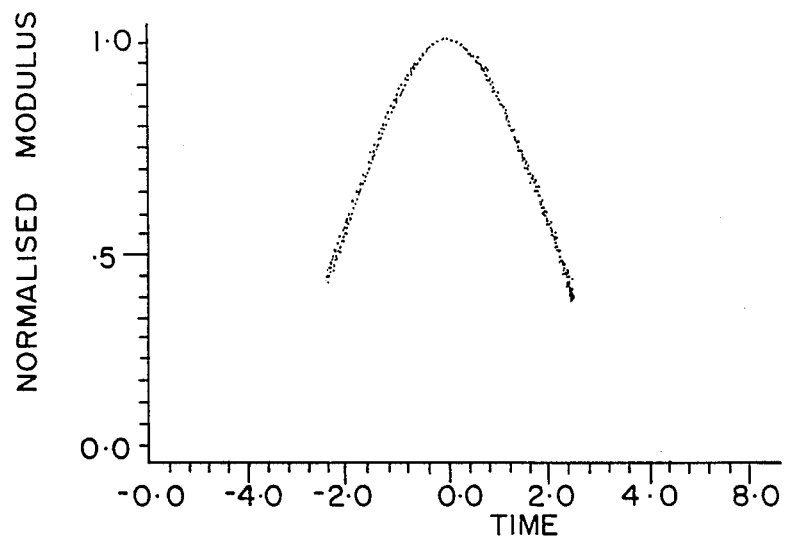
FIG. 3 is a graph on which the signal correlation peak is shown positioned by a least squares Gaussian fitting technique.

The best fit was found to be Gaussian: $A\exp[-a(t-t_0)^2]$ where "A" is the correlation peak amplitude and "t" is the time delay following some common point, such as the start of the transmission time of each pulse. The parameter "$t_0$" is the time displacement of the correlation peak, which was determined with a quadratic fitting technique. "a" is a free parameter which may also be derived via a quadratic fitting technique. A least squares routine was used to obtain better approximations for "A", and the Newton-Raphson method was implemented for simultaneously updating the estimates of "a" and "$t_0$". FIG. 3 shows the signal correlation peak positioned by the aforementioned least squares Gaussian fit.

The resultant improved estimates of arrival time facilitated reliable removal of the phase ambiguity, which in turn facilitated accurate calculation of the bearing "S" of the signal transmitter relative to the signal receiver. However, the bearing so calculated is preferably corrected for a variety of factors including current speed, sound speed, and time lag as will now be discussed.

Correction for Current Speed

Figure 6:
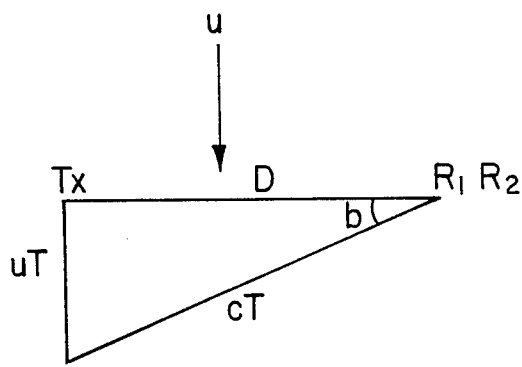
FIG. 6 diagrammatically illustrates the effect of current speed on the apparent bearing of the transmitter relative to the receiver.

During the time "T" taken for a signal to propagate from the transmitter toward the receiver, the apparent position of the transmitter (i.e. the apparent point of origin of the transmitted signal) is carried downstream a distance uT where "u" is the average current speed. This is shown diagrammatically in FIG. 6. The distance between the apparent source and the receiver is cT where "c" is the propagation velocity of the transmitted pulse. At the receiver, the difference "b" between the actual bearing to the transmitter and the bearing to the apparent transmitter source is given by:

$$\sin b = uT/cT = u/c$$

and the bearing "S" to the transmitter may be corrected by appropriately adding or subtracting the angle "b" depending on the direction of the current. The foregoing discussion assumes that the current speed "u" is uniform across the channel. A better estimate of the correction factor required to eliminate the effect of current flow could be obtained by determining the current speed as a function of distance between the transmitter and receiver. Such a function could be obtained with the aid of scintillation current meter techniques involving several transmitters and an array of receivers.

Correction for Sound Speed

The current speed correction factor discussed above also assumes that the propagation velocity "c" of the transmitted signal remains constant. In fact, the sound speed "c" varies continuously due to a number of factors. It is not necessary to know "c" precisely to apply the current speed correction factor though. An independently obtained representative measurement of "c" for the area of interest will suffice. Such representative measurements are usually accurate to within about 2–3%, so the correction obtained by applying the current speed correction factor will still be quite good.

Correction for Time Lag

Although the two receivers are separated by only a relatively short distance, signals must take different direct paths between the transmitter and either receiver. Hence, the phase difference is affected by small scale sound speed variations encountered over each of the two paths. As these variations are advected pas each of the transmitter/receiver acoustic paths they introduce short period (of order r/2u, where, "r" is the distance between the receivers) fluctuations in the apparent angle between the transmitter and the receivers. These small scale rapid fluctuations are to be distinguished from the larger scale variability which results in mean gradients that contribute a slowly varying and very much smaller change in the apparent angle between the transmitter and the receivers. In general, small scale fluctuations in the sound speed structure of the intervening water, of dimensions comparable to the spacing between the two receivers, produce rapid fluctuations in the phase of the received signal. For larger scale sound speed variability, the phase fluctuations are small and are almost the same for each receiver, but smaller scale variability introduces fluctuations that are different for each of the two paths and therefore show up as increased variance in the transmitter bearing measurements. However, one may utilize an observed property of such fluctuations so as to eliminate, or largely reduce, their contribution to the phase or angle-of-arrival variance. Specifically, one may utilize the fact that such small scale variability moving successively through the two acoustic paths (i.e. the paths between the transmitter and each of the two receivers) remains relatively unchanged as it travels the short distance between the two paths. Therefore, by delaying the measurement from one receiver by an appropriate time lag $\iota$, with respect to the other receiver, it is possible to eliminate the coherent portion of the fluctuations observed at the two receivers. Of course, this process will be more effective if the time taken, at any point along the two paths, for the sound speed fluctuations to move between those paths, is independent of position. For two parallel paths, which may be assumed to exist in a system having two transmitters and two receivers, this condition will only apply for a uniform flow. For a single transmitter and two receivers it applies if the flow speed increases in proportion to the path spacing. Nevertheless, even though the condition for complete elimination of variance will not normally be achieved, it will be sufficient to produce a significant variance reduction if the time lag $\tau$ is appropriately chosen. For example, in the experimental test described, a single transmitter and two receivers were used, so that the condition for elimination of variance is that the perpendicular component of flow speed increase linearly (and at the right rate) from the transmitter to the receiver. In fact the flow speed was independently found to be nearly uniform across the channel. Yet, by following the procedure hereinafter described, the standard deviation of calculated arrival angle was reduced by 40%.

The time lag "$\tau$" may be determined from the maximum of the time-lagged cross-correlation of a phase time series obtained from each receiver by time shifting one phase time series $\phi_1(t)$ with respect to the other $\phi_2(t)$, by an amount $\tau$, so chosen that on average the small scale fluctuations in sound speed are advected from one acoustic path to the other, before calculation of the arrival angle of the signal. In this way sound travelling from the transmitter to the first receiver is passing through, as nearly as possible, the same sound speed environment as the signal reaching the second receiver. The deviations in apparent arrival angle introduced by the sound speed fluctuations are therefore minimized. In order to determine the appropriate value of time shift $\tau'$ to use, short sections of $\phi_1(t)$ are cross-correlated with $\phi_2(t)$ for a small range of positive and negative time lags, and the time lag corresponding to the maximum of the cross-correlation is chosen. (Alternatively, in an analog circuit, the same time shift could be achieved by means of an appropriate feedback loop.)

It should be noted that the time delay $\tau$ chosen in this way will be of order r/2u. (The precise value will depend also on the shape of the velocity profile along the path.) The average speed u recovered in this way is then used to compute the correction due to the mean flow perpendicular to the path. Particularly, if the receivers yield phase time series $\phi_1(t)$ and $\phi_2(t)$ respectively, one may cross-correlate the two time series and then seek that value of $\tau$ such that $[\phi_1(t)\cdot\phi_2(t+\tau)]$ is a maximum where the square brackets denote an average over some suitable period. The technique recognizes that perturbations moving through first one acoustic path (i.e. from the transmitter to the first receiver) and then another (i.e. from the transmitter to the second receiver) produce phase time series which are similar, except that irregularities in one are delayed with respect to the other. By taking segments of each time series and multiplying them together, the resultant product will have a maximum value associated with a "best fit" which is then identified with the time lag $\tau$. Indeed, the average current speed "u" may be determined directly from the time lag $\tau$ for which the correlation product identified above is a maximum. This average current speed "u" is then used in the correction for bending by the mean flow.

It will also be noted that if the signal propagation velocity "c" is continuously determined as described above the values so obtained can be used to update the effect of mean flow deflection of the transmitted signal. However, corrections made by updating in this fashion will be minor and will have to depend upon some independent means of sound speed determination since, in general, the precise range from the transmitter to the receivers will not be known and thus reciprocal transmission measurements will not accurately reflect "c". In special cases, where the range to the transmitter is known, the speed is recovered from the reciprocal travel time of a pulse in each direction. More generally, range will not be known and sound speed will have to be determined by some other means, such as by the use of sound speed profiling devices.

Figure 4:
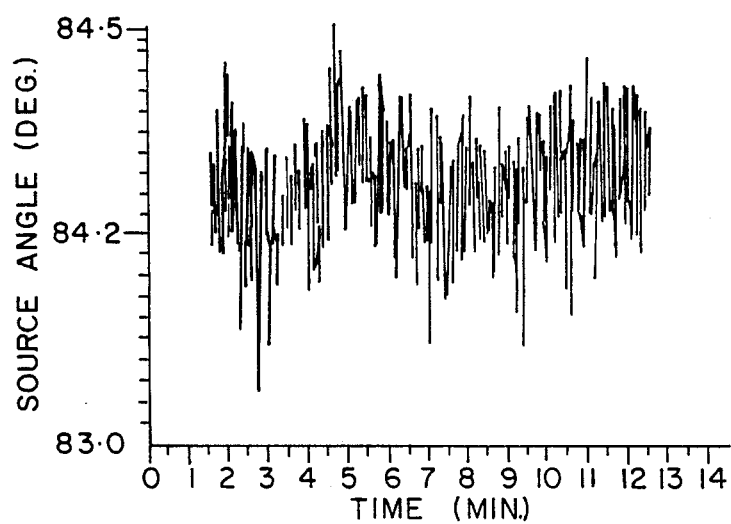
FIG. 4 is a graph on which the bearing to the transmitter is shown as the ordinate versus time as the abscissa.
Figure 5:
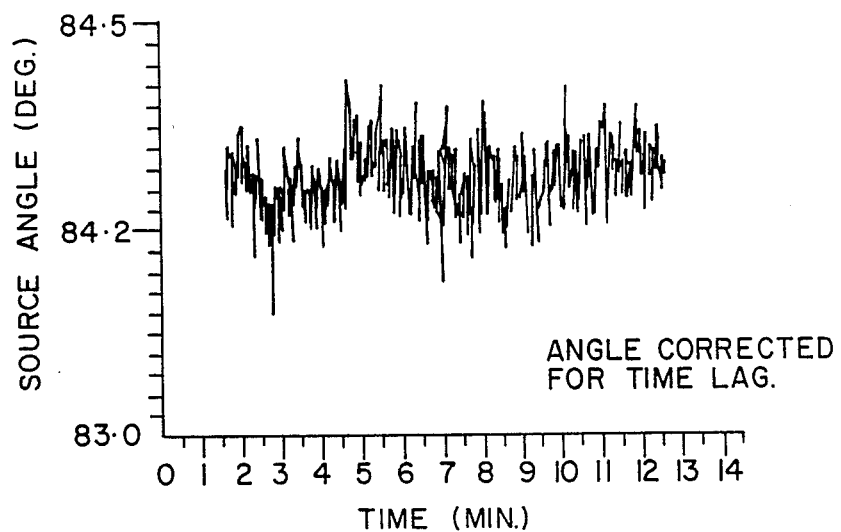
FIG. 5 shows the same data as FIG. 4, after correcting for time lag.

FIG. 4 shows 5 hertz measurements of the bearing to the transmitter prior to application of the time lag correction factor and with a standard deviation of 0.069 degrees. FIG. 5 shows the remarkable improvement attained by applying the time lag correction factor—standard deviation reduced by over 40% to 0.041 degrees.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method of determining a bearing "S" of a signal transmitter relative to a remote signal receiver, said method comprising the steps of:
   (a) transmitting, from said transmitter, a signal pulse having a carrier frequency "$\omega$", and having a high signal to noise ratio;
   (b) sampling said transmitted pulse at first and second closely spaced receivers displaced from said transmitter by a distance "D" which may vary over time;
   (c) for each of said receivers, deriving a sampled pulse phase component by:

(i) deriving in-phase and quadrature components of said sampled pulse and, (ii) deriving an arctangent of each of said in-phase and quadrature components;

(d) for each of said receivers, measuring an arrival time "t" at which said sampled pulses arrive at each of said receivers respectively, by fitting a predetermined function, by least squares, to one of, a modulus, or, an amplitude envelope, of said pulse samples;

(e) determining a difference "ωt" between said arrival times of said sampled pulses at each of said receivers;

(f) determining an approximate phase difference $$\Delta\phi = 2\pi\omega\delta t$$

between said sampled pulses;

(g) using said phase difference to resolve phase ambiguity of said phase components; and, (h) determining said bearing "S" as $$\cos(S) = \frac{(\Delta\phi)(c)}{(2\pi)(\omega)r}$$

where

"c" = propagation velocity of said pulse; and,

"r" = displacement between said receivers.

2. A method as defined in claim 1, wherein there is a first acoustic path between said transmitter and said first receiver, and a second acoustic path between said transmitter and said second receiver, said method further comprising correcting said bearing for small scale fluctuations in sound speed between said transmitter and each of said receivers by delaying the sampling of said transmitted pulse at said second receiver for a time "τ" equal to the average time taken for said sound speed fluctuations to move from said first acoustic path to said second acoustic path.

3. A method as defined in claim 1, further comprising correcting said bearing for small scale fluctuations in sound speed between said transmitter and each of said receivers by;

(a) deriving short segments of a first time series $\phi_1(t)$ of said phase components derived for said first receiver, and a second time series $\phi_2(t)$ of said phase components derived for said second receiver;

(b) cross-correcting the phase time series for each receiver, as a function of time lag τ;

(c) selecting theat value of τ which yields the maximum cross-correlation value;

(d) with said first and second phase time series time shifted by the value of τ selected in step (c), evaluating the corresponding bearing "S"; and, (e) repeating steps (b) through (d) for each successive time series segment.

4. A method as defined in claim 3, further comprising, after step (e), averaging the bearings evaluated during each occurrence of step (d) to obtain a final determination of said bearing "S".

5. A method as defined in claim 1, wherein said pulse is transmitted through a medium which moves with a component of velocity "u" perpendicular to the acoustic path between said transmitter and receivers, thereby causing said bearing to appear to deviate from the actual bearing of said transmitter relative to said receivers; said method further comprising correcting said bearing for said relative medium movement by applying a factor u/c as the sine of the difference between said actual and determined bearings.

6. A method as defined in claim 2, wherein said pulse is transmitted through a medium which moves with a component of velocity "u" perpendicular to the acoustic path between said transmitter and receivers, thereby causing said bearing to appear to deviate from the actual bearing of said transmitter relative to said receivers; said method further comprising correcting said bearing for said relative medium movement by applying a factor u/c as the sine of the difference between said actual and determined bearings.

7. A method as defined in claim 3, wherein said pulse is transmitted through a medium which moves with a component of velocity "u" perpendicular to the acoustic path between said transmitter and receivers, thereby causing said bearing to appear to deviate from the actual bearing of said transmitter relative to said receivers; said method further comprising correcting said bearing for said relative medium movement by applying a factor u/c as the sine of the difference between said actual and determined bearings.

* * * * *

UNITED STATES PATENT AND TRADEMARK OFFICE
CERTIFICATE OF CORRECTION

PATENT NO. : 4,800,541

DATED : January 24, 1989

INVENTOR(S) : David M. Farmer, Jane A. Verrall

It is certified that error appears in the above-identified patent and that said Letters Patent is hereby corrected as shown below:

Column 5, line 64, change "Aexp" to -- Apex --.
Column 6, line 64, change "advected" to -- affected --.
Column 6, line 64, change "pas" to -- past --.
Column 7, line 24, change "ι" to -- τ --.
Column 8, line 2, change "of order" to -- of the order of --.

Column 10, line 5, change "theat" to -- the --.

Signed and Sealed this

Seventh Day of November, 1989

Attest:

JEFFREY M. SAMUELS

Attesting Officer      Acting Commissioner of Patents and Trademarks